United States Patent [19]

Alexandersson

[11] Patent Number: 4,717,803

[45] Date of Patent: Jan. 5, 1988

[54] ELECTRODE HOLDER FOR ELECTRIC DISCHARGE MACHINES

[76] Inventor: Johnny Alexandersson, 821 Thorton Ct., Schaumberg, Ill. 60193

[21] Appl. No.: 793,837

[22] Filed: Nov. 1, 1985

[51] Int. Cl.⁴ ............................................. B23H 7/26
[52] U.S. Cl. .................................. 219/69 E; 204/286
[58] Field of Search ................. 219/69 E, 69 V, 69 R, 219/138; 204/297 R, 286

[56] References Cited

U.S. PATENT DOCUMENTS

| | | | |
|---|---|---|---|
| 2,922,022 | 1/1960 | Mironoff | 219/69 E |
| 2,978,616 | 4/1961 | Pfau | 219/69 E |
| 3,271,848 | 9/1966 | Montandon | 219/69 E |
| 3,337,709 | 8/1967 | Bugher | 219/69 V |
| 3,474,215 | 10/1969 | Johanson | 219/69 E |
| 3,629,540 | 12/1971 | Altfeld | 219/69 E |
| 3,719,579 | 3/1973 | Cross et al. | 204/297 R |
| 3,727,023 | 4/1973 | Monnich | 219/69 E |
| 3,741,573 | 6/1973 | Treer | 219/69 E |
| 3,939,322 | 2/1976 | Bonga | 219/69 E |
| 4,020,313 | 4/1977 | Koga et al. | 219/69 E |
| 4,088,032 | 5/1978 | O'Connor | 219/69 E |
| 4,395,613 | 7/1983 | Barr et al. | 219/69 E |

FOREIGN PATENT DOCUMENTS

| | | | |
|---|---|---|---|
| 57-61414 | 4/1982 | Japan | 219/69 E |
| 149121 | 8/1982 | Japan | 219/69 E |
| 163026 | 10/1982 | Japan | 219/69 E |
| 205026 | 12/1982 | Japan | 219/69 E |

Primary Examiner—Philip H. Leung
Assistant Examiner—Geoffrey S. Evans

[57] ABSTRACT

An electrode holder particularly useful in electric discharge machining where it is required to attach quickly and accurately in succession a number of electrodes to the quill of the machine. One side of a housing of the electrode holder attaches to the quill while a threaded shaft protrudes from an opposite side. An opening in the housing provides access for rotating the shaft so that the thread end may be screwed into a threaded hole in one end of the electrode. Accurate alignment of the electrode is provided by alignment pins in the housing. Lubricating and cleaning fluid can flow from a bore in the quill through the shaft and to the electrode.

7 Claims, 6 Drawing Figures

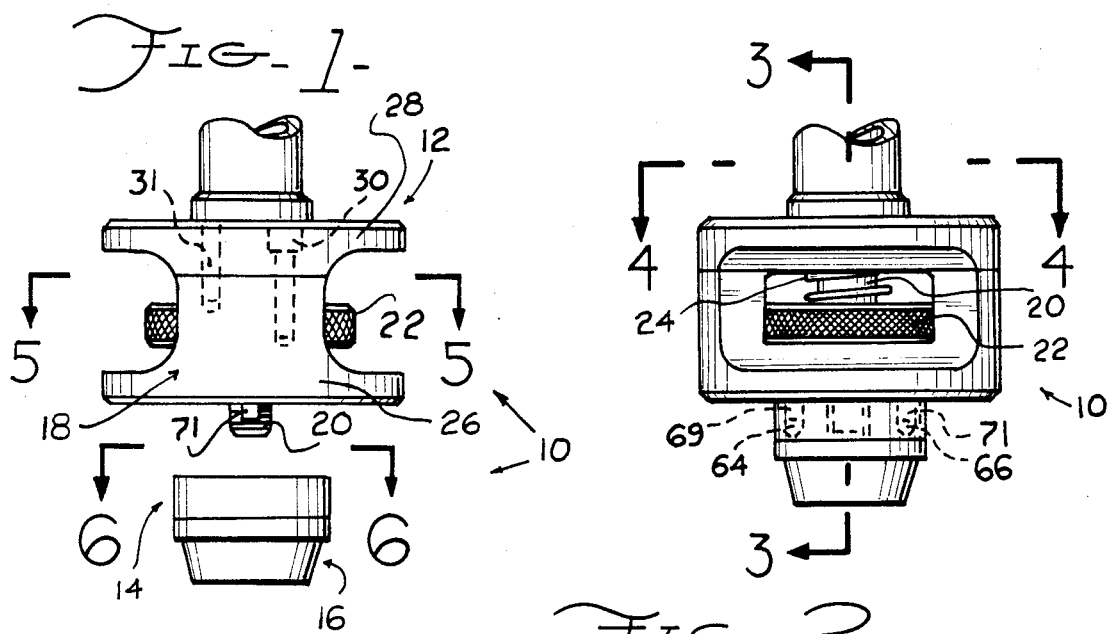
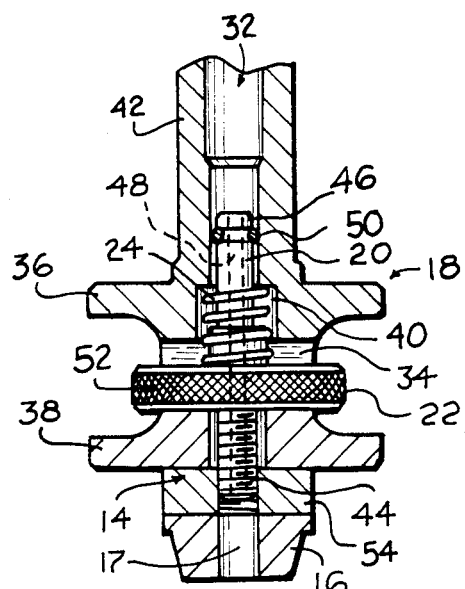
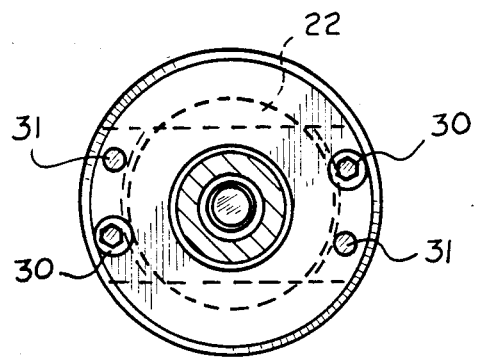
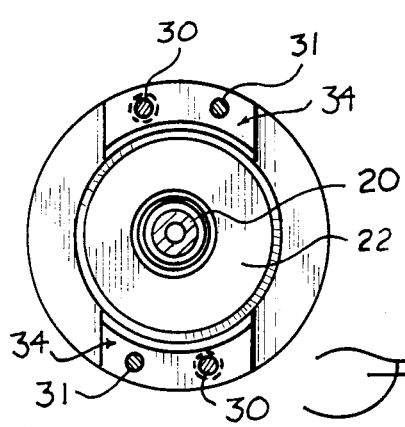
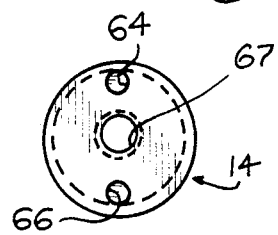

ELECTRODE HOLDER FOR ELECTRIC DISCHARGE MACHINES

BACKGROUND OF THE INVENTION

1. Field of the Invention

This invention relates generally to tool holders and more specifically to a device which attaches an electrode to the quill of an electric discharge machine.

2. Description of the Prior Art

An electric discharge machine brings the surface of an electrode into close proximity with a metal surface that is to be worked on. By developing a voltage between the the electrode and the surface, an electric arc is created which erodes the metal surface so that it assumes the shape of a mirror image of the proximate surface of the electrode. By this technique, shapes of surfaces (such as square holes) can be provided which cannot be obtained with other machining techniques.

Improvements in the technique have been introduced to meet the demand for more intricacy, greater precision, and faster production. These improvements have been achieved, in part, by providing machines that can accurately move the electrode from one location to another and by configuring the electrode holders so that electrodes can be substituted for successive machining operations.

The electrode holder must provide accurate, reproducible positioning of the electrodes. For improved productivity, the electrodes should be able to be quickly replaced.

The quality of the machining operation is also improved by flushing the metal surface with a fluid so as to remove debris generated by the spark erosion process. The stream of fluid should be directed at the point of generation of the electric arc for greatest effectiveness.

A number of prior art patents disclose electrode holders which provide ease of interchange, accurate electrode mounting, or efficient surface flushing. However, no electrode holder disclosed in the prior art provides all three of these features in a single unit.

For example, U.S. Pat. No. 3,711,105 teaches a threaded electrode which is screwed into a bore provided in an electrode holder. The electrode holder has pins which engage holes in the electrode to to provide accurate alignment of the electrode to the holder. U.S. Pat. No. 3,939,322 discloses an electrode provided with a tapered shank which fits into a mating recess provided in an electrode holder. U.S. Pat. No. 3,816,691 teaches a hollow electrode holder through which a flushing fluid is directed, but does not teach a simple, quick, and effective structure for attaching and detaching electrodes.

A common type of electric discharge system is known in the industry as a 3R type system. A problem with 3R type systems is that it requires an expensive blank stem for each electrode.

SUMMARY OF THE INVENTION

An object of this invention is to provide an electrode holder for an electric discharge machine to which an electrode can be quickly attached and detached, and which positions the electrode rigidly and with great accuracy.

Another object of this invention is to provide an electrode holder which directs a flow of fluid to the electric arc produced by the electric discharge machine.

Yet another object of this invention is to eliminate the need for providing an expensive stem for each electrode.

Briefly, the electrode holder of the present invention includes a housing having an upper end permanently attached to a quill of the electric discharge machine. The housing partially encloses a hollow cylindrical shaft having a protruding end which is pressed into a bore provided in the quill. The other end of the shaft is threaded and protrudes from an opposing end of the housing.

The shaft may slide axially within housing to a limited extent, but is restrained from sliding completely out of the housing by an annular knob provided midway to its length. A spring inside the housing urges the threaded end of the shaft out of the housing. A pair of alignment pins are provided at the lower end of the housing.

The electrode holder of the present invention also includes a plate which is permanently affixed to the upper surface of an electrode, and which is provided with a threaded bore receptive to the threaded shaft and a pair of alignment holes receptive to the alignment pins.

The knob and thus the shaft can be rotated by gripping the circumference of the knob through openings provided on opposing sides of the housing. As the shaft is turned, its threads engage the threaded hole of the plate to draw plate firmly against the lower side of the housing. The alignment holes of the plate receive alignment pins to accurately align the electrode.

The shaft is hollow so that pressurized fluid may be pumped through the shaft to the electrode. An 'O' ring seal is provided around the shaft to enage the inner surface of the housing to prevent leaks.

An advantage of the present invention is that it is simple in construction, and yet holds an electrode accurately and rigidly.

Another advantage of the present invention is that an electrode can be quickly removed or replaced.

Yet another advantage of the present invention is that fluid is directed through the electrode holder directly to the worked surface.

A still further advantage of this invention is that the electrodes can be removably attached to the expensive stems by inexpensive base plates, so that there is no longer a requirement that a user purchase a stem for each electrode.

These and other objects and advantages of the present invention will no doubt become apparent upon a reading of the following descriptions and a study of the several figures of the drawing.

BRIEF DESCRIPTION OF THE DRAWINGS

FIG. 1 is an elevational view of the electrode holder device in accordance with this invention;

FIG. 2 is a side elevational view of FIG. 1;

FIG. 3 is a cross sectional view taken along line 3—3 of FIG. 2;

FIG. 4 is a cross sectional view taken along line 4—4 of FIG. 2;

FIG. 5 is a cross sectional view taken along line 5—5 of FIG. 1; and

FIG. 6 is a view taken along line 6—6 of FIG. 1.

DETAILED DESCRIPTION OF THE PREFERRED EMBODIMENT

Referring to the partially exploded view of FIG. 1, an electrode holder 120 in accordance with the present invention includes a holder assembly 12 and a base plate 14. An electrode 16 having a central bore 17 is attached, preferably by an adhesive, to base plate 14. Referring additionally to FIGS. 2–4, holder assembly 12 includes a housing 18, a shaft 20, a knob 22 affixed to shaft 20, and a compression spring 24.

Housing 18 is preferably made in sections so that the holder assembly 12 can be disassembled for repair and inspection. A lower section 26 of housing 18 is attached to and aligned with an upper section 28 of housing 18 by two machine bolts 30 and two alignment pins 31. Housing 18 has a central bore 32, a transverse slot 34, and a pair of annular flanges 36 and 38. A counterbore 40 is provided within housing 18 to provide a shoulder for spring 24.

The upper portion of housing 18 is formed into an elongated, hollow quill 42 which attaches a quill-holder (such as a 3R system quill-holder) that is attached to an electric discharge machine. A lubricating fluid can be pumped into central bore 32 to lubricate the machine surface.

Shaft 20 has a threaded end 44 and an unthreaded end 46. Shaft 20 is provided with a longitudinal bore 48 which allows fluid communication between hollow quill 42 and the base plate 14. An O-ring seal 50 provides a fluid tight seal between the unthreaded end 46 of shaft 20 and the central bore 32 of quill 42.

Knob 22 is disc shaped and is provided with a threaded, axial bore (not shown), and is preferably provided with a knurled circumference 52. Knob 22 is tightly screwed on threaded end 44 to attach it to a mid-length portion of shaft 20, such that rotation of knob 22 will cause a corresponding rotation of shaft 20.

Compression spring 24 is enaged with a shoulder provided by counterbore 40 and with the upper surface of knob 22. Spring 24 biases shaft 20 such that threaded end 44 is urged out of the lower end of central bore 32.

It will be noted that the engagement of knob 22 with the upper and lower surfaces of transverse slot 34 limits the longitudinal motion of shaft 20. As will be explained subsequently, this limited longitudinal movement of shaft 20 permits electrode assemblies to be removed and replaced in tight quarters.

Referring more particularly to FIGS. 6, 2, and 1, base plate 14 is a disk shaped member having a pair of alignment holes 64 and 66, and a central, threaded bore 67. Alignment holes 64 and 66 engage alignment pins 69 and 71, respectively, which extend downwardly from flange 38.

Base plate 14 is attached, preferably by an adhesive such as Eastman 910 glue, to an electrode 16. The resulting assembly may then be aligned with and attached to the holder assembly 12. If the electrode is made from a hard substance such copper, copper graphite, or tungsten, the base plate 14 may be eliminated by drilling alignment holes and a central, threaded bore directly into the electrode material. However, the base plate must still be used for soft electrode materials, such as graphite, to prevent stripping of the threads of the central bore.

In operation, electrodes 16 are prepared by a attaching them to base plate 14 or, if they are made from a hard material, they are drilled, reamed and threaded. The base plate 14 and/or electrode 16 is then engaged with the threaded end 44 of shaft 20 by rotating knob 22.

In tight quarters, shaft 20 can be moved upwardly by raising knob 22 within slot 34, allowing the base plate and electrode to be inserted and removed. This greatly speeds up the machining process, since the holder assembly 12 does not have to be moved away from the work piece in order to attach or remove the base plate and electrode assembly.

While this invention has been described in terms of a few preferred embodiments, it is contemplated that persons reading the preceding descriptions and studying the drawing will realize various alterations, permutations and modifications thereof. It is therefore intended that the following appended claims be interpreted as including all such alterations, permutations and modifications as fall within the true spirit and scope of the present invention.

What is claimed is:

1. An electrode holder for attaching an electrode having a fluid passage to the end of an electric discharge machine, said electrode holder comprising:

an elongated housing provided with a central bore and a transverse slot, said housing having a first end and a second end;

means for attaching a first end of said housing to an end of an electric discharge machine such that said central bore communicates with said electric discharge machine;

a shaft having a first end, a second end, and a longitudinal bore, said shaft being disposed within said central bore of said housing, said shaft loosely held within at least a portion of said central bore to permit movement of said shaft relative to said housing, said first end of said shaft being provided with first fastening means, said longitudinal bore extending between said first end and said second end of said shaft, said first end of the shaft having external threads, said longitudinal bore in fluid communication with said central bore at said first end of said housing;

means disposed within said housing for biasing said shaft towards a second end of said housing such that at least a portion of said first end of said shaft protrudes from said central bore;

knob means disposed within said slot and attached to a midlength portion of said shaft, wherein the engagement of said knob means with opposed extremities of said slot limits the longitudinal movement of said shaft;

means for coupling said first end of said shaft to an electrode such that said longitudinal bore is in fluid commmunication with a fluid passage of said electrode, said means for coupling including said external threads of the first end of the shaft; and alignment means for coupling said second end of said housing for communication with said electrode, said alignment means having a plurality of alignment pins projecting from the second end of the housing parallel said central bore.

2. An electrode holder as recited in claim 1 further comprising an attachment plate coupled to said electrode, said attachment plate being provided with second fastening means which matingly engages said first fastening means, said attachment plate having a plurality of alignment holes disposed to accept said alignment pins.

3. An electrode holder as recited in claim 1 further comprising sealing means provided between said second end of said shaft and said central bore.

4. The electrode holder as recited in claim 1 wherein said plurality of alignment pins are a pair of alignment pins, said pins spaced apart from said central bore by equal distances on a plane intersecting the center of said central bore.

5. An electrode holder as recited in claim 1 wherein said housing includes a pair of flange portions, one of which is located between said transverse slot and said first end of said housing, and the other of which is located between said transverse slot and said second end of said housing, said knob means being an arcuate knob axially fixed to said shaft, said pair of flange portions extending beyond the edges of said knob.

6. An electrode holder for attaching an electrode having a fluid passage to an electric discharge machine, said electrode holder comprising:

an elongated housing provided with a central bore and a transverse slot, said housing having a first end and a second end;

means for attaching a first end of said housing to an electric discharge machine such that said central bore is in fluid communication with said electric discharge machine;

an elongated shaft having a longitudinal axis and having a first end and a second end, said shaft being disposed within said central bore of said housing and said first end of said shaft having external threads, said shaft being loosely held within at least a portion of said central bore, thereby permitting movement along and rotation about said longitudinal axis;

spring means disposed within said housing for biasing said shaft towards a second end of said housing such that at least a portion of said first end of said shaft protrudes from said housing;

a knob disposed within said slot and axially attached to a midlength portion of said shaft, wherein the engagement of said knob with opposed extremities of said slot limits the longitudinal movement of said shaft and rotation of said knob causes rotation of said shaft;

means for coupling said first end of said shaft to an electrode such that said electric discharge machine is in fluid communication with a fluid passage of said electrode, said means for coupling including said external threads of the first end of the shaft; and a pair of alignment pins projecting from said second end of said housing on opposed sides of said central bore, said pair of alignment pins being equidistant from said central bore and disposed on a plane intersecting the center of said central bore.

7. The electrode holder as recited in claim 6 further comprising an attachment plate coupled to said electrode, said attachment plate having an internally threaded bore disposed to matingly engage said external threads of the first end of the shaft, said attachment plate having a pair of alignment holes disposed to accept said alignment pins.

* * * * *